United States Patent
Mellas et al.

(10) Patent No.: US 7,484,298 B2
(45) Date of Patent: Feb. 3, 2009

(54) METHOD FOR FORMING A COMPLEX-SHAPED TUBULAR STRUCTURE

(75) Inventors: Spyros P. Mellas, Waterford, MI (US); Paul A. Benton, Clinton Township, MI (US); Charles J. Bruggemann, Rochester Hills, MI (US); Mark Goebel, St. Clair Shores, MI (US); Joseph M. Lendway, IV, Dryden, MI (US); Tuan A. Ngo, Farmington Hills, MI (US); Peter M. Parlow, Columbus, MI (US); Carl W. Robinson, Almont, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 410 days.

(21) Appl. No.: 11/358,666

(22) Filed: Feb. 21, 2006

(65) Prior Publication Data

US 2007/0193013 A1 Aug. 23, 2007

(51) Int. Cl.
*B21D 53/88* (2006.01)
*B21D 26/02* (2006.01)
*B23P 17/00* (2006.01)

(52) U.S. Cl. .................. 29/897.2; 29/421.1; 29/525.14; 72/54; 72/368; 72/370.22

(58) Field of Classification Search ................ 29/897.2, 29/421.1, 525.14; 72/54, 58, 61, 62, 368, 72/370.06, 370.22, 370.27, 379.2
See application file for complete search history.

(56) References Cited

U.S. PATENT DOCUMENTS

| | | | |
|---|---|---|---|
| 5,333,775 A | | 8/1994 | Bruggemann et al. |
| 5,339,667 A | | 8/1994 | Shah et al. |
| 5,398,533 A | | 3/1995 | Shimanovski et al. |
| 5,924,316 A | * | 7/1999 | Streubel et al. ................ 72/51 |
| 6,182,487 B1 | * | 2/2001 | Komiya et al. ................ 72/58 |
| 6,623,067 B2 | | 9/2003 | Gabbianelli et al. ......... 296/205 |
| 6,842,957 B2 | * | 1/2005 | Van Giezen ................ 29/421.1 |
| 2003/0159289 A1 | * | 8/2003 | Van Giezen ................ 29/897.2 |
| 2005/0257587 A1 | * | 11/2005 | Tomizawa et al. .............. 72/61 |
| 2005/0257591 A1 | * | 11/2005 | Hauger et al. ................. 72/368 |

* cited by examiner

*Primary Examiner*—Jermie E Cozart

(57) ABSTRACT

A method is provided for forming a complexly-shaped tubular structure such as a tapered pillar or other structure for a vehicle body. A sheet metal blank having a longitudinal axis is rolled about the longitudinal axis to form a tubular shape and the side edges of the blank are then welded together to form a tube. The tube is then enclosed in a hydroforming die and pressurized to conform the tube to the shape of the die and thereby form the desired complex shape. The sheet metal blank may be formed by the end-to-end welding together of a plurality of separate sheet metal blanks that differ from one another in characteristic including material thickness, material alloy composition, and/or coating. One or more of the blanks can have side edges that are non-parallel so that the tube will taper in diameter along its length.

6 Claims, 7 Drawing Sheets

METHOD FOR FORMING A COMPLEX-SHAPED TUBULAR STRUCTURE

FIELD OF THE INVENTION

The present invention relates to hydroforming a complexly-shaped tubular structure.

BACKGROUND OF THE INVENTION

It is known to hydroform a tube by enclosing the tube in a die and then using internal pressure to expand the tube outwardly into conformance with the shape of the die.

It is often desirable that such a hydroformed tube have different characteristics, such as metal thickness or material, along its length. To that end, U.S. Pat. No. 5,333,775 Bruggemann et al, assigned to the assignee of this invention, proposed that tubes of different material, perimeter or thickness could be welded together end-to-end to form a tubular blank that could then be hydroformed.

It would be desirable to provide further improvements in the method of manufacture of hydroformed tubular structures of complex shape.

SUMMARY OF THE INVENTION

The present invention provides a new and improved method for forming a complexly-shaped tubular structure such as a tapered pillar or other structure for a vehicle body. A sheet metal blank having a longitudinal axis is rolled about the longitudinal axis to form a tubular shape and the side edges of the blank are then welded together to form a tube. The tube is then enclosed in a hydroforming die and pressurized to conform the tube to the shape of the die and thereby form the desired complex shape. The sheet metal blank may be formed by the end-to-end welding together of a plurality of separate sheet metal blanks that differ from one another in characteristics including material thickness, material alloy composition, and coating. One or more of the blanks can have side edges that are non-parallel so that the tube will taper in diameter along its length.

The present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of the certain exemplary embodiment(s) is merely exemplary in nature and is in no way intended to limit the invention, its application, or uses.

Figures 1, 2:
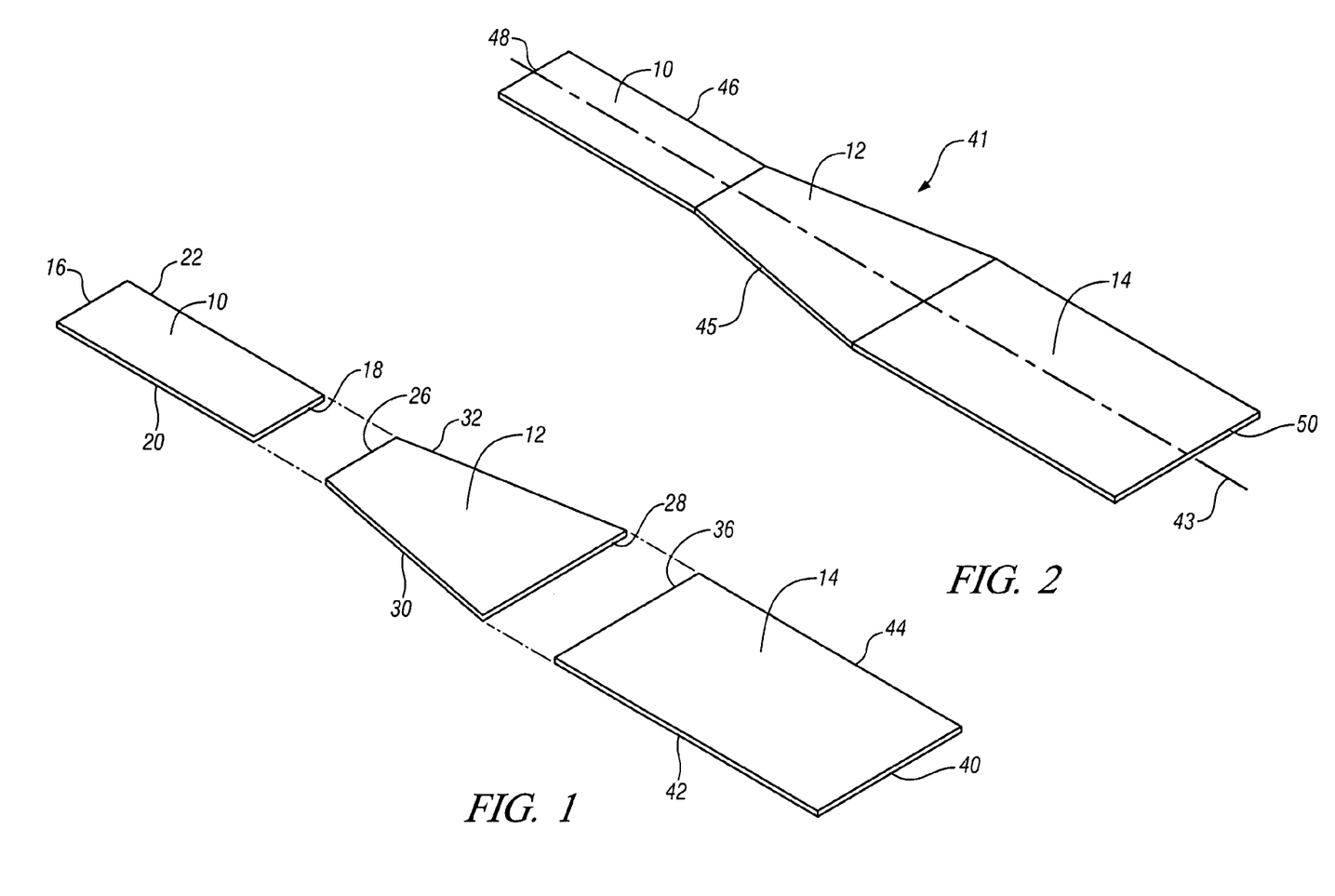
FIG. 1 is a perspective view showing three sheet metal blanks.
FIG. 2 is a perspective view showing that the three sheet metal blanks have been butt-welded together end-to-end to form a one-piece blank.

Referring to FIG. 1, three sheet metal blanks 10, 12 and 14 have been blanked from a coil or a larger panel and are laid end-to-end. The blank 10 is rectangular and has ends 16 and 18, and side edges 20 and 22. The blank 12 is a rhomboid and has ends 26 and 28 and side edges 30 and 32. The side edges 30 and 32 are of equal length but are not parallel with each other. The blank 14 has ends 36 and 40, and side edges 42 and 44. The end 18 of blank 10 and end 26 of blank 12 are of the same width. The end 28 of blank 12 and the end 36 of blank 14 are of the same width.

FIG. 2 shows the blanks 10, 12, and 14 arranged in end to end engagement with one another. Blank 10 is buff welded to the blank 12. Blank 12 is butt welded to the blank 14. Thus, as seen in FIG. 2, the plurality of individual blanks have been assembled into a single composite blank 41 of complex shape, having a longitudinal extending axis 43, longitudinal extending side edges 45 and 46, an upper end 48 and a lower end 50. As seen in FIG. 2, the composite blank 41 tapers along its length, as provided by the non-parallel side edges of the blank 12, and by the blank 14 being wider than the blank 10.

Figure 3:
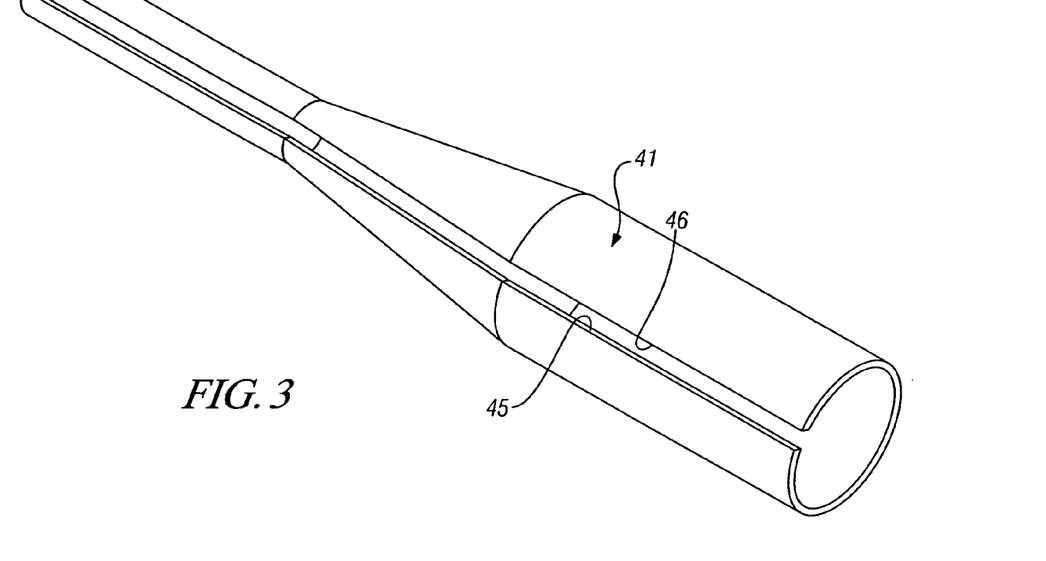
FIG. 3 is a perspective view showing that the one-piece blank of FIG. 2 has been rolled to a near tubular shape of nearly circular cross section.

FIG. 3 shows that the composite blank 41 of FIG. 2 has been rolled or otherwise formed about its longitudinal axis 43 to form a tubular shape with the side edges 45 and 46 of the composite blank 41 brought into proximity with one another.

Figure 4:
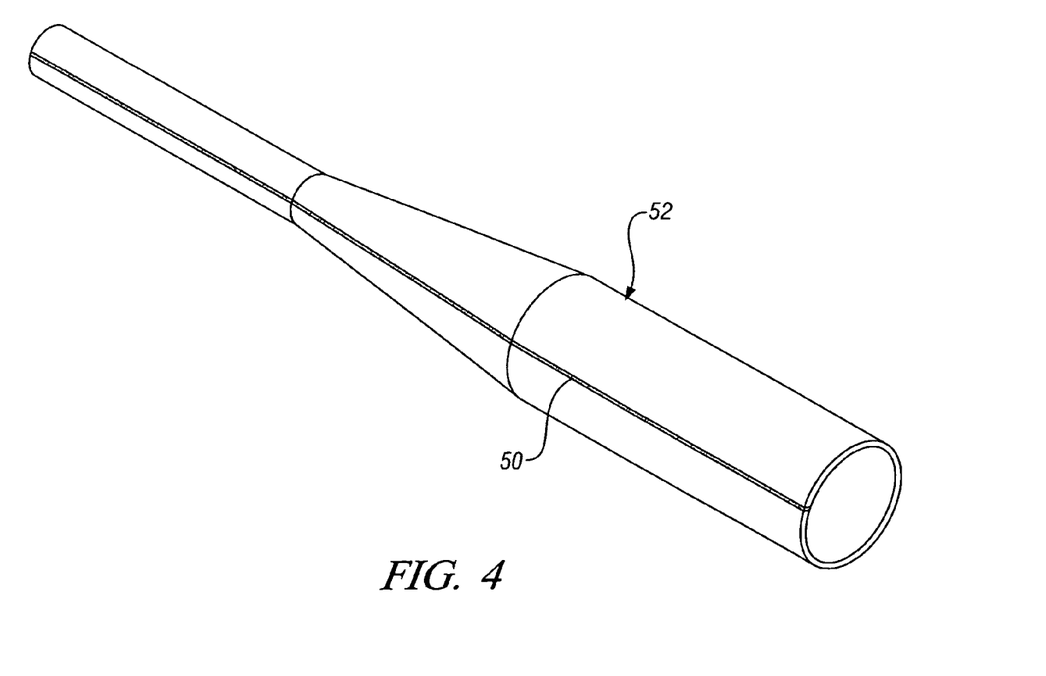
FIG. 4 is a perspective view showing that a seam has been welded to join the side edges of the one-piece blank and thereby form a tube.

FIG. 4 shows that the side edges 45 and 46 have been welded together to form a continuous seam 50, thereby forming a tube 52 suitable for hydroforming.

Figures 5, 6:
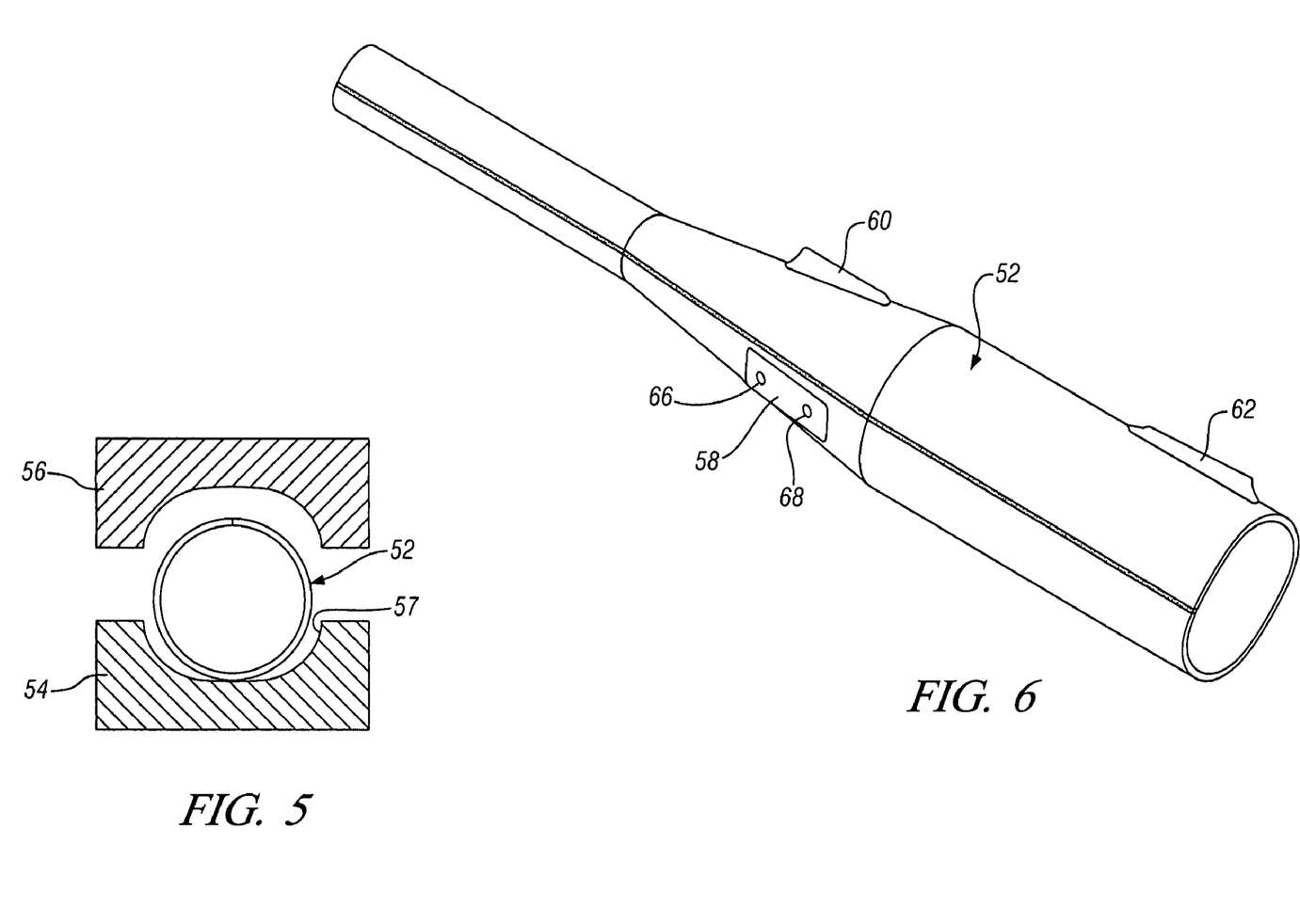
FIG. 5 is a cross-sectional view showing the tube of FIG. 4 placed in a hydroforming die for the application of internal pressure for conforming the tube to the shape of the die cavity.
FIG. 6 is a perspective view showing that the tube of FIG. 4 has been hydroformed to a complex shape including hydroformed bulges and hydroformed holes to form a pillar for a vehicle body.

FIG. 5 shows the tube 52 placed in a hydroforming die comprised of lower die 54 and upper die 56 that will close relative to one another to form a die cavity 57. Methods for hydroforming are well known in industry and generally include placing a tube between a pair of dies, closing the dies to capture the tube, and then pressurizing the interior of the tube to expand the tube outwardly into conformance with the shape of the cavity in the dies. One example of a hydroforming process is described in U.S. Pat. No. 5,339,667, Shah et al, assigned to the assignee of this invention.

FIG. 6 shows the tube 52 subsequent to the tube being hydroformed to a complex shape for use as a pillar in an automobile body. In FIG. 6, it is seen that the hydroformed tube is generally elliptical in cross section and includes bulges at 58, 60, and 62, which in the case of a vehicle pillar, may facilitate the mounting of door hinges and door latch strikers. In addition, the bulge 58 has holes 66 and 68 hydroformed therein, for example by the hydropiercing process of U.S. Pat. No. 5,398,533, Shimanovski et al, assigned to the assignee of this invention.

Figure 7:
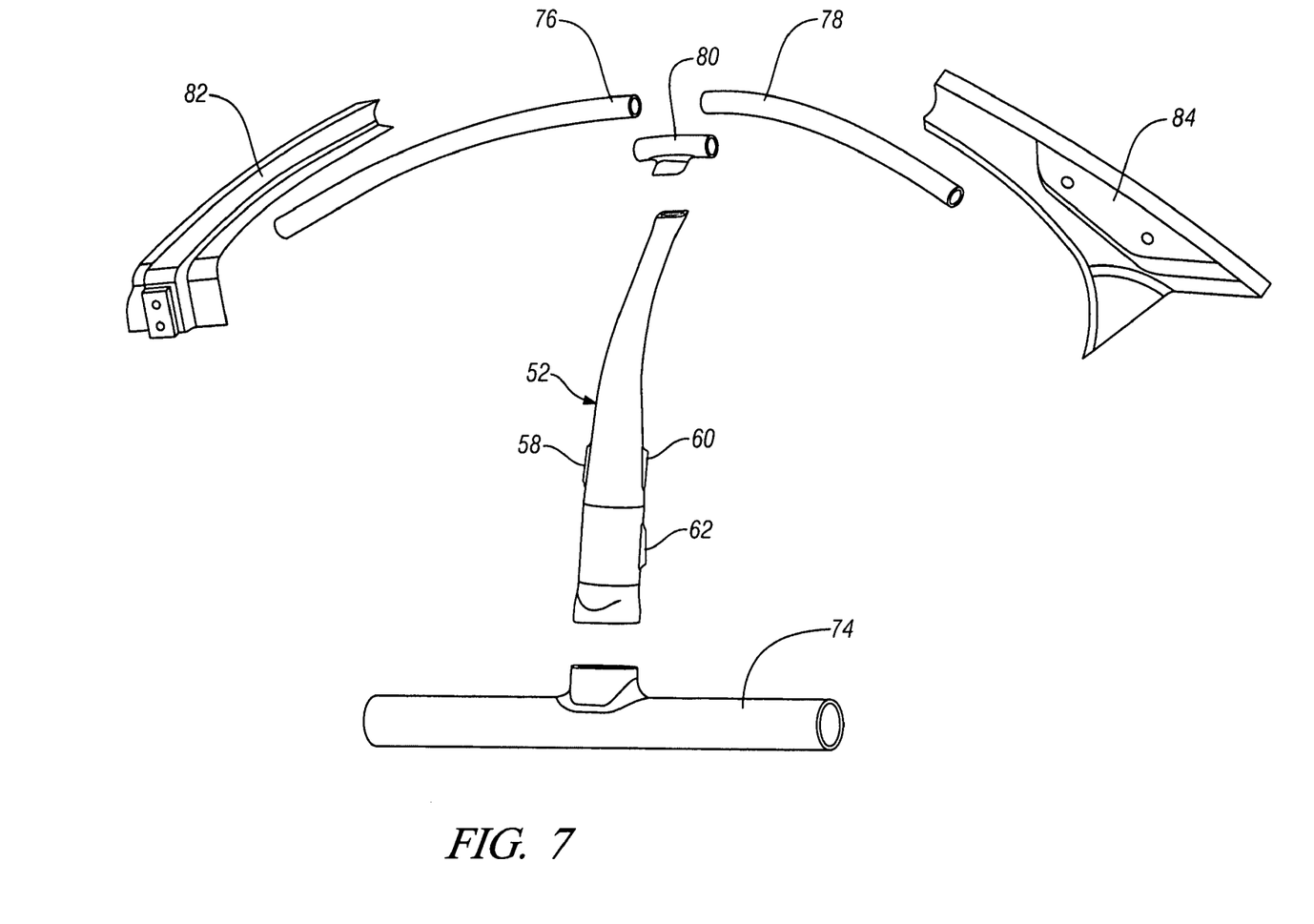
FIG. 7 is a perspective view showing the pillar of FIG. 6 poised for assembly with other hydroformed and stamped components to form a vehicle body side ring.

FIG. 7 shows the hydroformed tube 52 poised for assembly with other hydroformed tubes and sheet metal stampings to form a vehicle body side ring assembly. In particular, the components for the side ring assembly include a hydroformed rocker tube 74, a roof rail comprised of tubes 76 and 78 and connector tube 80, as well as front pillar stamping 82 and rear pillar stamping 84.

The foregoing process for forming a hydroformed tube readily enables the manufacture of a vehicle component of complex shape and selected characteristics. Referring again to FIG. 1, it will be appreciated that the blanks 10, 12 and 14 may be of different thickness of sheet metal. For example, in the case of hydroformed pillar for a motor vehicle body, the blank 14 may be thicker than the blank 12, and the blank 12 may be thicker than the blank 10. In this way, the strength of the pillar can be tailored to provide the greater strength where needed. It may be desirable that the blank 14 be of galvanized steel, while the blanks 10 and 12 can be uncoated steel. Or the blanks 10, 12 and 14 can be of different alloys of steel, if desired. Furthermore, the shape of the tube can be of different diameter along the length thereof by the selected use of rhomboid-shaped blanks such as the blank 12 in order to provide a tube that tapers along its length when the blank is rolled to its tubular shape.

Figure 8:
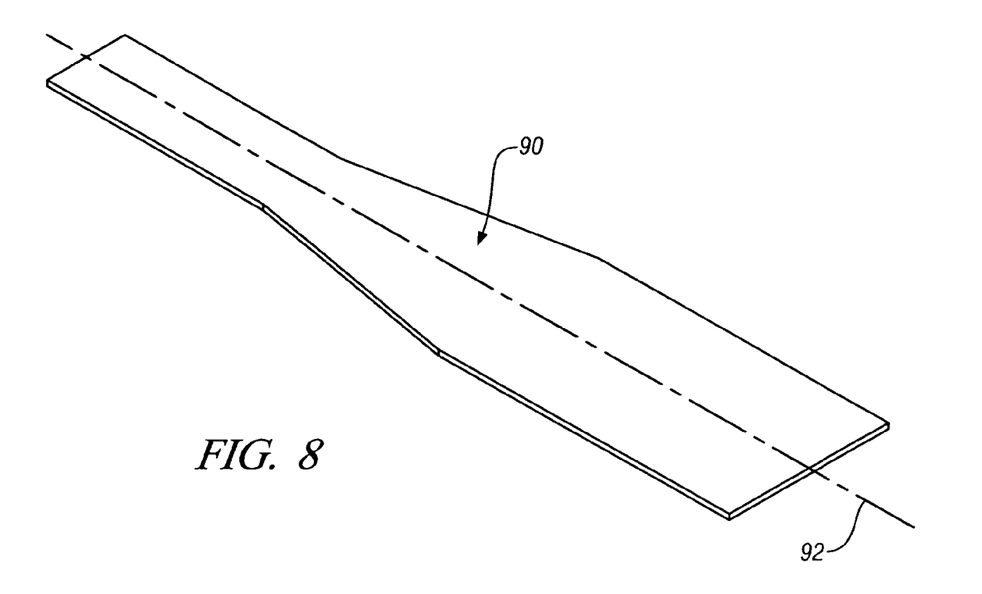
FIG. 8 is a perspective view showing another embodiment of the invention in which a one-piece stamped blank is employed rather than the blank shown in FIGS. 1 and 2.

Another embodiment of the invention is shown in FIG. 8. In FIG. 8, a blank 90 has been stamped from a single piece of material to obtain a blank that is the same shape as the blank 41 of FIG. 2 that was assembled by welding together the three separate blanks 10, 12, and 14. The blank 90 is symmetrical about a longitudinal extending axis 92. The blank 90 of FIG. 8 has tapered mid-section and parallel edged end sections. The blank 90 will be rolled into tubular shape and seam welded to form a tube suitable for subsequent hydroforming. The one-piece blank of FIG. 8 may be employed in those cases where the only characteristic that is to be varied is the taper of the tube.

Figure 9:
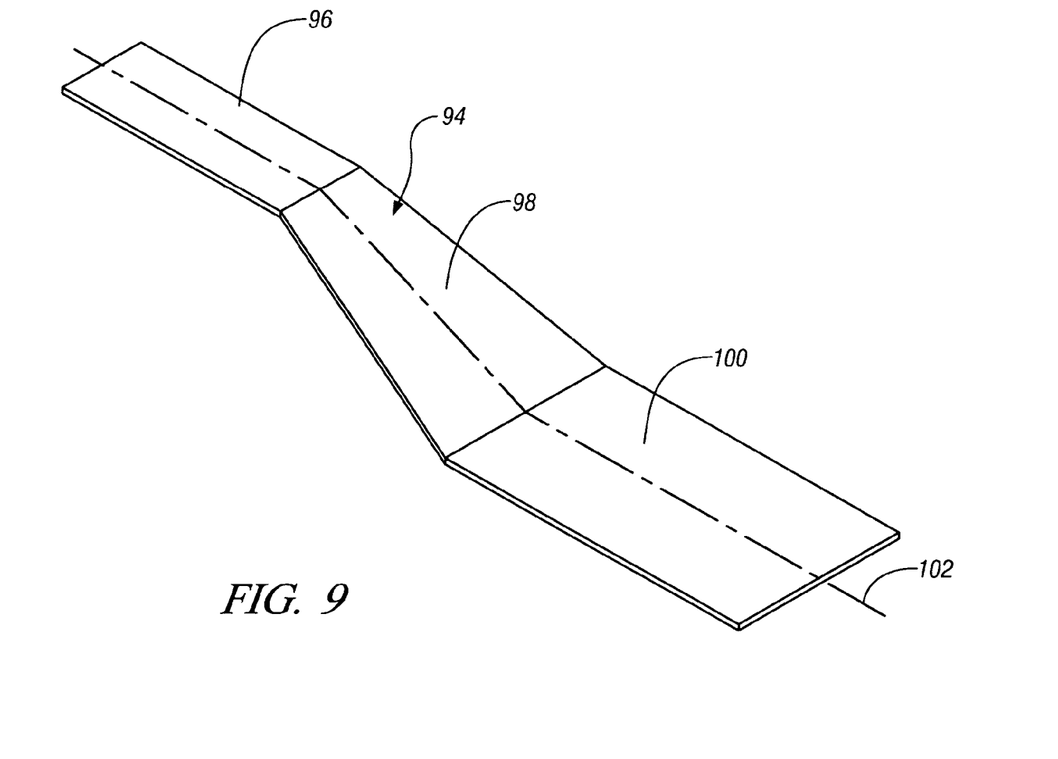
FIG. 9 is a perspective view showing yet another embodiment of the invention having three welded-together sheet metal blanks having a non-linear longitudinal axis.

FIG. 9 shows that a composite blank 94 has been formed by welding together end-to-end separately stamped blanks 96, 98 and 100. The end-most blanks 96 and 100 are offset from one another and connected by trapezoidal-shaped central blank 98, so that the longitudinal center line axis 102 of the composite blank 94 is non-linear as shown in FIG. 9. Thus, when the composite blank 94 is rolled and seam welded to form a tubular shape, the resulting tube will have a non-linear longitudinal center line axis 102. Thus, the final hydroformed tube shape may be non-linear and offset along its length.

Figure 10:
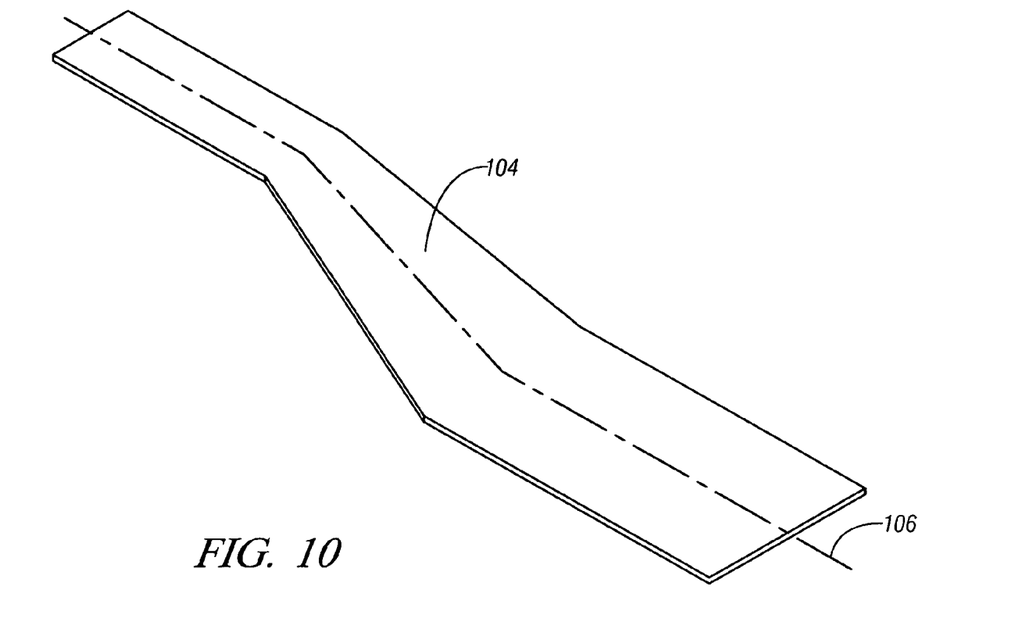
FIG. 10 is a perspective view showing another embodiment in which a one-piece blank has a non-linear longitudinal axis.

FIG. 10 shows that a blank 104 can be stamped out of one piece of material and has a non-linear longitudinal center line 106. Thus, when the blank 104 is rolled and seam welded to the tubular shape, the resulting tube will have a non-linear center line. The one-piece blank of FIG. 10 may be employed in those cases where the only characteristic that is to be varied is the taper of the tube.

Figure 11:
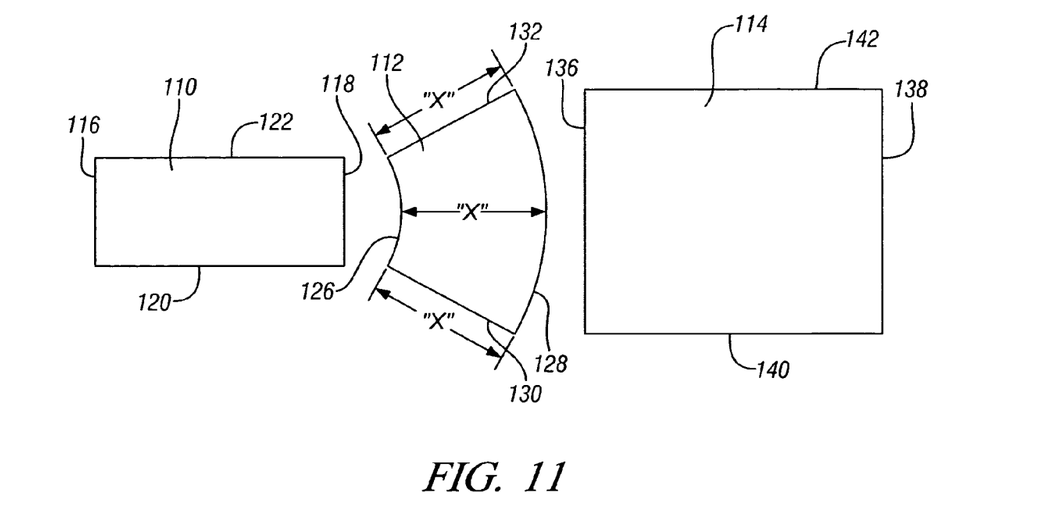
FIG. 11 is a plan view of another embodiment and showing three sheet metal blanks.
Figure 12:
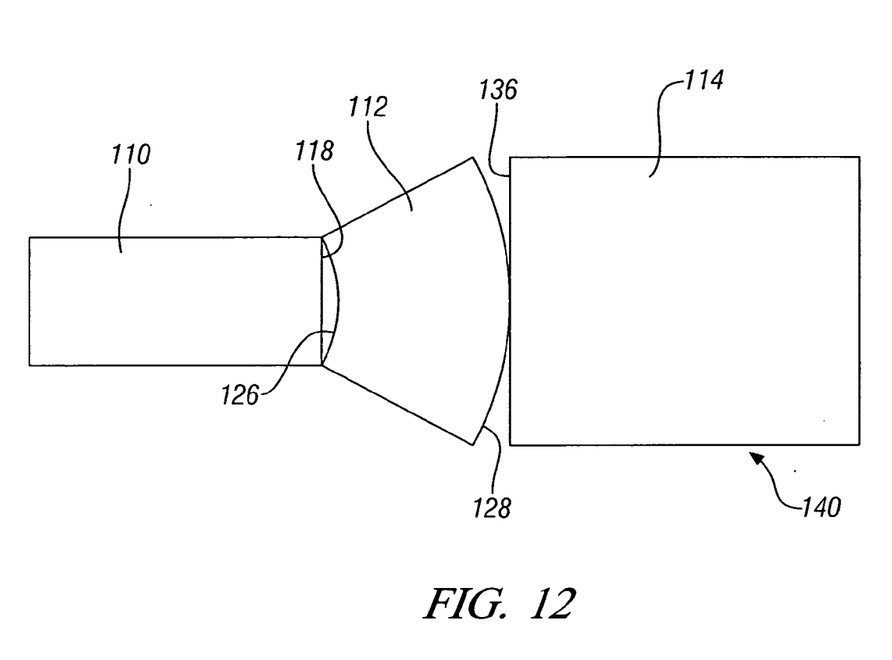
FIG. 12 is a plan view showing the three sheet metal blanks of FIG. 11 tack welded end-to-end in readiness for rolling to a tube shape.

FIGS. 11 and 12 show yet another embodiment of the invention. In FIG. 11, three sheet metal blanks 110, 112 and 114 have been blanked from a coil or from a large panel and are laid end-to-end. The blank 110 is rectangular and has ends 116 and 118, and side edges 120 and 122. The blank 112 has ends 126 and 128 and side edges 130 and 132. The side edges 130 and 132 are of equal length designated "x" in FIG. 11, but are not parallel with each other. The end 126 is concavely curved and the end 128 is convexly curved so that the length of the blank 112 between the center of the concavely curved end 126 and the center of the convexly curved end 128 is also the same length "x" as the length of the side edges 130 and 132. The blank 114 has ends 136 and 138 and side edges 140 and 142.

FIG. 12 shows the blanks 110, 112, and 114 arranged in end-to-end engagement with one another. It will be appreciated that blank 110 and the blank 112 are of the same width at the adjoining end edges 118 and 126. And the blank 112 and blank 114 are of the same width at their adjoining end edges 128 and 136. The corners of end wall 118 of blank 110 are tack welded to the corners of the end wall 126 of blank 112 at the edges thereof, with a gap remaining between the blanks 110 and 112 as caused by the concave shape of the end wall 126 of the blank 112. The center portion of the convexly curved end wall 128 of the blank 112 is tack welded to the end wall 136 of the blank 114. Thus, as seen in FIG. 12, the plurality of individual blanks have been assembled into a single composite blank 141 of complex shape It will be understood that the composite blank of FIG. 12 will be rolled into a tube shape as was shown in FIG. 3, then a longitudinal seam will be welded as in FIG. 4 of the first embodiment. In addition, the butt seams between the blank 110 and 112, and the butt seams between blanks 112 and 114 will be completely welded so that the tube formed thereby will be fluid tight for subsequent hydroforming to the final desired shape within dies similar to those of FIG. 5.

The composite blank shape that is shown in FIG. 12 may be stamped from a single piece of material in those cases where the only characteristic that is to be varied is the taper of the tube.

The foregoing description of the invention is merely exemplary in nature and, thus, variations thereof are intended to be within the scope of the invention. For example, it will be understood that although FIG. 1 shows three blanks that are assembled end to end to form a composite blank, it may be desirable to use just two blanks or any other number of blanks to obtain the desired combinations of taper, coatings, material thickness and material alloy composition.

In this way, a hydroformed tubular structure of complex shape and differing characteristic along its length may be readily formed to great advantage in the manufacture of high strength vehicle pillars and other structures for use in vehicle bodies as well as other articles of manufacture. The hydroformed tubular structure may have either a straight longitudinal axis, or a non-linear longitudinal axis with offset tubular portions. Thus, the product design engineer may choose among the teachings herein to design and manufacture a product of widely varying characteristic and shape.

The invention claimed is:

1. A method of forming a complexly-shaped tubular structure comprising:
    blanking a first sheet having parallel side edges and a first end edge;
    blanking a second sheet having non-parallel side edges and a first end edge that is either convexly shaped or concavely shaped;
    abutting together the first end edges of the first sheet and second sheet and tack welding together the points of contact between the first end edges of the first and second sheets to form a composite blank;
    rolling the tacked together first and second sheets to form a tubular shape;
    welding together the first end edges of the first and second sheets where not already tacked together, and welding together the parallel side edges of the first sheet, and welding together the non-parallel side edges of the second sheet; and hydroforming the tube in a die to form the complex shape.

2. The method of claim 1 in which the first and second sheets are different from each other in at least one characteristic chosen from one or more of material alloy, material thickness, and coating.

3. The method of claim 1 in which the first and second sheets are of the same width at their first end edges, one of the first end edges is convexly curved and the first end edges are tack welded together prior to rolling to form a tube and then the adjoining first end edges are butt welded after rolling.

4. The method of claim 1 in which the first and second sheets are of the same width at their first end edges, one of the first end edges is concavely curved and the first end edges are tack welded together prior to rolling to form a tube and then the adjoining first end edges are butt welded after rolling.

5. A method of forming a complexly-shaped tubular structure comprising:

blanking a first rectangular sheet having parallel side edges and a first end edge;

blanking a second rectangular sheet of greater width than the first rectangular sheet and having parallel side edges and a first end edge;

blanking a third sheet having non-parallel side edges, a first end edge of convex shape; and a second end edge of concave shape;

abutting the first end edge of the first sheet with the concave shaped end of the third sheet and tack welding the points of contact between the first and third sheets;

abutting together the first end edge of the second sheet with the convex shaped end of the third sheet and tack welding the point of contact between the first end edges of the second and third sheets to form a composite blank of the tack welded together first, second and third sheets;

rolling the tacked together first and second and third sheets to form a tubular shape in which side edges of the blanks abut and the end edges abut;

welding together the end edges of the first and third sheets and the end edges of the second and third sheets wherever not already tacked together, and welding together the abutting side edges to form a tube; and hydroforming the tube in a die to form the complex shape.

6. The method of claim 5 in which at least two of the first, second, and third sheets are different from each other in at least one characteristic chosen from one or more of material alloy, material thickness, and coating.

* * * * *